United States Patent
Wu et al.

(10) Patent No.: US 10,476,275 B2
(45) Date of Patent: Nov. 12, 2019

(54) MULTI-LOAD CONTROL APPARATUS AND SLAVE CIRCUIT AND CONTROL METHOD THEREOF

(71) Applicant: RICHTEK TECHNOLOGY CORPORATION, Zhubei, HsinChu (TW)

(72) Inventors: Chang-Yu Wu, Zhubei (TW); Yi-Wei Lee, Taipei (TW)

(73) Assignee: RICHTEK TECHNOLOGY CORPORATION, Zhubei, Hsinchu (TW)

( * ) Notice: Subject to any disclaimer, the term of this patent is extended or adjusted under 35 U.S.C. 154(b) by 412 days.

(21) Appl. No.: 15/284,643

(22) Filed: Oct. 4, 2016

(65) Prior Publication Data
US 2017/0338663 A1    Nov. 23, 2017

Related U.S. Application Data

(60) Provisional application No. 62/338,250, filed on May 18, 2016.

(51) Int. Cl.

| | |
|---|---|
| *H02J 3/14* | (2006.01) |
| *H02J 4/00* | (2006.01) |
| *H02M 7/217* | (2006.01) |
| *H05B 37/02* | (2006.01) |
| *H02M 1/08* | (2006.01) |

(Continued)

(52) U.S. Cl.
CPC .......... *H02J 4/00* (2013.01); *H02M 1/08* (2013.01); *H02M 5/293* (2013.01); *H02M 7/217* (2013.01); *H05B 33/0815* (2013.01); *H05B 37/02* (2013.01); *H05B 37/0272* (2013.01); *H02M 2005/2935* (2013.01)

(58) Field of Classification Search
CPC ... H02J 4/00; H05B 37/0272; H05B 33/0815; H05B 37/02; H02M 1/08; H02M 5/293; H02M 7/217; H03K 17/61
See application file for complete search history.

(56) References Cited

U.S. PATENT DOCUMENTS

| | | | |
|---|---|---|---|
| 2004/0080962 A1* | 4/2004 | Charych | H02M 3/33515 363/21.11 |
| 2010/0225249 A1* | 9/2010 | Liao | H02M 3/33507 315/297 |

(Continued)

*Primary Examiner* — Rexford N Barnie
*Assistant Examiner* — Rasem Mourad
(74) *Attorney, Agent, or Firm* — Tung & Associates

(57) ABSTRACT

The present invention provides a multi-load control apparatus, a slave circuit and a control method thereof. The multi-load control apparatus includes a master circuit and at least one slave circuit. The master circuit generates at least one pulse width modulation (PWM) signal according to an input signal. The slave circuit controls a power switch according to a corresponding PWM signal. The slave circuit has a primary side circuit and a secondary side circuit. The primary side circuit generates an AC PWM signal according to the corresponding PWM signal. The power switch has a control terminal which is driven according to a floating ground level which is not a constant voltage level. The power switch has a current inflow terminal and a current outflow terminal, which are connected to a corresponding load circuit in series, wherein the series circuit of the power switch and the load circuit receives an AC voltage.

16 Claims, 9 Drawing Sheets

(51) Int. Cl.
   *H02M 5/293*   (2006.01)
   *H05B 33/08*   (2006.01)

(56) References Cited

U.S. PATENT DOCUMENTS

| | | | |
|---|---|---|---|
| 2012/0008344 A1* | 1/2012 | Zeng | H03K 17/6877 |
| | | | 363/21.11 |
| 2015/0002044 A1* | 1/2015 | Han | H05B 33/0815 |
| | | | 315/223 |
| 2015/0168983 A1* | 6/2015 | Chen | H03K 17/61 |
| | | | 700/286 |
| 2016/0218628 A1* | 7/2016 | Yao | H02M 3/33507 |

* cited by examiner

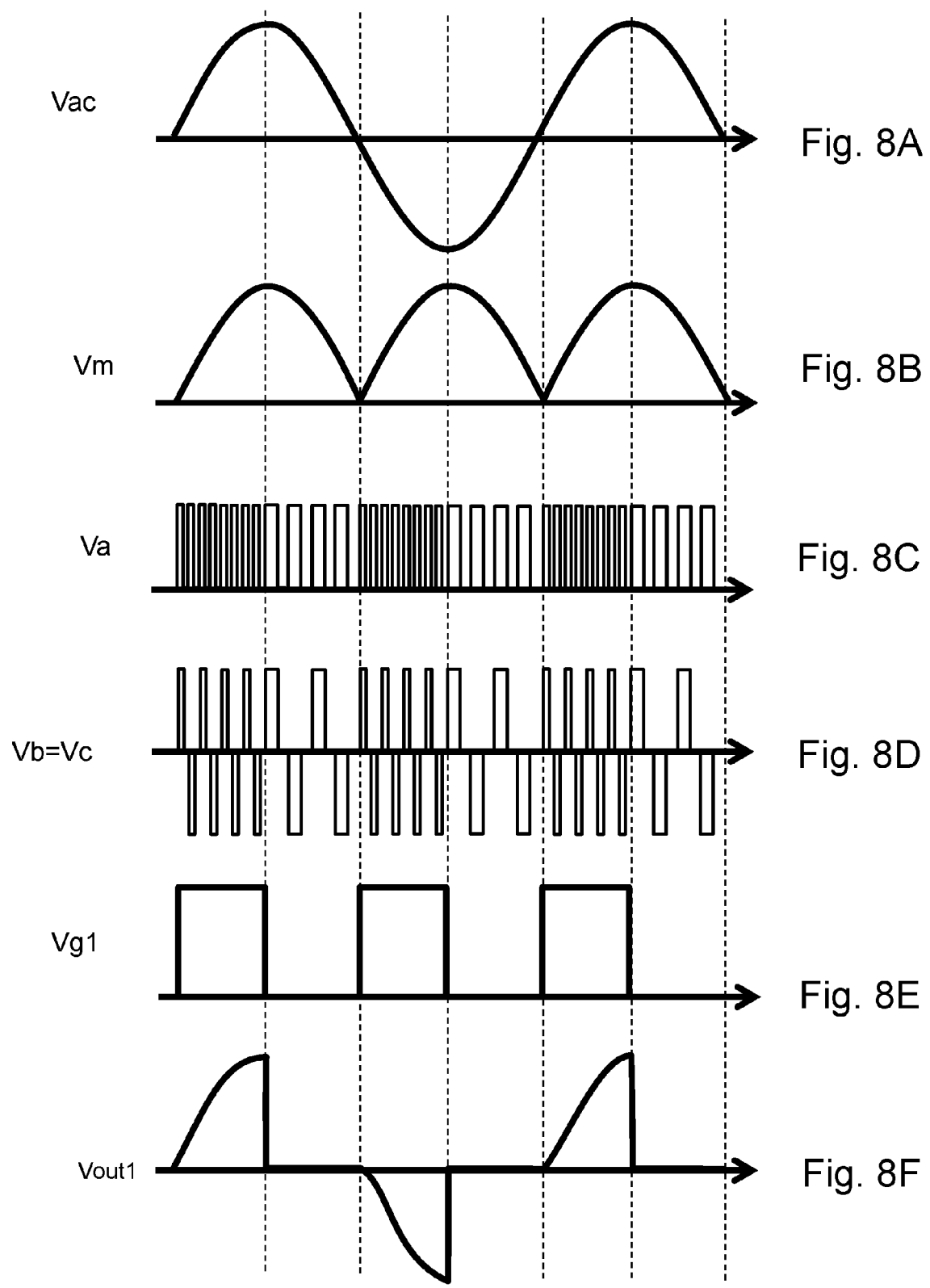

MULTI-LOAD CONTROL APPARATUS AND SLAVE CIRCUIT AND CONTROL METHOD THEREOF

CROSS REFERENCE

The present invention claims priority to U.S. 62/338,250, filed on May 18, 2016.

BACKGROUND OF THE INVENTION

Field of Invention

The present invention relates to a multi-load control apparatus and a slave circuit and a control method thereof; particularly, it relates to such a multi-load control apparatus controlling multiple slave circuits, wherein each slave circuit includes a primary side circuit which generates an AC PWM signal according to a PWM signal to achieve individual control, and a slave circuit and a control method thereof.

Description of Related Art

FIG. 1 shows a conventional wireless dimmable lamp circuit 100. As shown in FIG. 1, the wireless dimmable lamp circuit 100 receives an AC voltage Vac, and adjusts the brightness of a lamp according to a wireless input signal Swl. As shown in FIG. 1, in order to control the brightness of each lamp individually, each wireless dimmable lamp circuit 100 includes a control circuit 101. The control circuit 101 includes circuits for receiving and processing a wireless input signal Swl to generate a dimming signal, and a dimming circuit which controls a power switch according to the dimming signal, to adjust the brightness of the lamp.

There are at least two disadvantages of the prior art wireless dimmable lamp circuit 100: first, because it requires circuits for receiving and processing the wireless input signal and the dimming circuit, its manufacturing cost is much higher (over 20 times) than a non-dimmable lamp; second, the circuits for receiving and processing the wireless input signal need to sustain a high temperature generated by the lamp, and therefore are easily damaged.

In view of above, the present invention proposes a multi-load control apparatus and a slave circuit and a control method thereof, wherein a master circuit controls at least one slave circuit, and each slave circuit operates a corresponding load circuit. Both/all the load circuits share one master circuit to reduce the manufacturing cost, and the master circuit is not required to sustain the high temperature generated by the load circuit. The load circuit is for example but not limited to a dimmable lamp circuit. In addition to controlling multiple dimmable lamp circuits, the present invention can be applied to other applications for controlling multiple load circuits.

SUMMARY OF THE INVENTION

From one perspective, the present invention provides a multi-load control apparatus comprising: a master circuit, configured to operably generate at least one pulse width modulation (PWM) signal according to an input signal; and at least one slave circuit, which is coupled to the master circuit, and is configured to operably generate at least one switch control signal according to a corresponding one of the at least one PWM signal, to control at least one corresponding power switch; wherein the slave circuit includes a primary side circuit and a secondary side circuit, wherein the primary side circuit and the master circuit are commonly coupled to a ground level, and the primary side circuit is configured to generate an AC PWM signal according to the corresponding PWM signal, and wherein the secondary side circuit is coupled to a control terminal of the power switch, and the secondary side circuit is configured to operably generate the switch control signal according to the corresponding AC PWM signal; wherein the power switch operates according to the switch control signal received by the control terminal; wherein the control terminal is driven according to a floating ground level which is not a constant voltage level; and wherein the power switch has a current inflow terminal and a current outflow terminal, and is configured to be operably connected to a load circuit in series, and the series circuit of the power switch and the load circuit is configured to receive an AC voltage.

In one preferable embodiment, the AC PWM signal has a first status and a second status, wherein a time period of the first status determines a conductive period of the switch control signal, and a time period of the second status determines a non-conductive period of the switch control signal, whereby a phase-cut angle of the AC voltage is determined by the first status and the second status.

In one preferable embodiment, the master circuit includes: a rectifier circuit, configured to operably receive the AC voltage to generate an rectified voltage; a power regulation circuit, which is coupled to the rectifier circuit, and is configured to operably receive the rectified voltage to generate a DC voltage as a positive power source supplied to the master circuit and the primary side circuit; and a PWM signal generation circuit, which is coupled to the power regulation circuit to receive the DC voltage, and is configured to generate the at least one PWM signal according to the input signal.

In one preferable embodiment, the slave circuit includes: the primary side circuit, configured to operably generate the AC PWM signal according to the PWM signal; an isolation device, which has a primary side unit electrically connected to the primary side circuit and a secondary side unit electrically connected to the secondary side circuit, wherein and the secondary side unit is isolated from the primary side unit, and wherein the isolation device is configured to operably transfer the AC PWM signal from the primary side unit to the secondary side unit and further to the secondary side circuit; and the secondary side circuit, configured to operably generate the switch control signal according to the AC PWM signal.

In one preferable embodiment, the isolation device includes a transformer or an opto-coupler.

In one preferable embodiment, the PWM signal or the AC PWM signal has a modulated frequency, wherein a conductive period of the switch control signal is determined by a time period wherein the PWM signal or the AC PWM signal operates by a first frequency, and a non-conductive period of the switch control signal is determined by a time period wherein the PWM signal or the AC PWM signal operates by a second frequency; or the PWM signal or the AC PWM signal has a modulated duty ratio, wherein the conductive period of the switch control signal is determined by a time period wherein the PWM signal or the AC PWM signal operates by a first duty ratio, and the non-conductive period of the switch control signal is determined by a time period wherein the PWM signal or the AC PWM signal operates by a second duty ratio.

In one preferable embodiment, the PWM signal or the AC PWM signal has the modulated frequency, and the secondary side circuit includes: a rectifier circuit, which is coupled to the secondary side unit, and is configured to operably convert the AC PWM signal to a rectified PWM signal; a filter circuit, which is coupled to the rectifier circuit, and is configured to operably filter the rectified PWM signal to generate a filtered signal; a comparison circuit, which is coupled to the filter circuit, and is configured to operably generate a comparison signal according to the filtered signal and a reference signal; a logic circuit, which is coupled to the comparison circuit, and is configured to operably generate a setting signal according to the comparison signal and the rectified PWM signal; a latch circuit, which is coupled to the logic circuit, and is configured to operably generate a control signal according to the setting signal and the comparison signal; and a driver circuit, which is coupled to the latch circuit, and is configured to operably generate the switch control signal according to the control signal.

In one preferable embodiment, the PWM signal or the AC PWM signal has the modulated duty ratio, wherein the secondary side circuit includes: a rectifier circuit, which is coupled to the secondary side unit, and is configured to operably convert the AC PWM signal to a rectified PWM signal; a filter circuit, which is coupled to the rectifier circuit, and is configured to operably filter the rectified PWM signal to generate a filtered signal; a comparison circuit, which is coupled to the filter circuit, and is configured to operably generate a comparison signal according to the filtered signal and a reference signal; and a driver circuit, which is coupled to the comparison circuit, and is configured to operably generate the switch control signal according to the comparison signal.

In one preferable embodiment, the load circuit includes a light emitting device circuit, and the switch control signal is configured to dim a brightness of the light emitting device circuit.

In one preferable embodiment, the input signal includes a wireless input signal.

From another perspective, the present invention provides a slave circuit of a multi-load control apparatus, wherein the multi-load control apparatus includes a master circuit and at least one the slave circuit, wherein the master circuit is configured to operably generate at least one pulse width modulation (PWM) signal according to an input signal, and wherein the at least one slave circuit is coupled to the master circuit, and is configured to operably generate at least one switch control signal according to a corresponding one of the at least one PWM signal, to control at least one corresponding power switch, the slave circuit comprising: a primary side circuit, which is configured to operably generate an AC PWM signal according to the corresponding PWM signal, wherein the primary side circuit and the master circuit are commonly coupled to a ground level; a secondary side circuit, which is coupled to a control terminal of the power switch, and is configured to operably generate the switch control signal according to the AC PWM signal, such that the power switch operates according to the switch control signal received by the control terminal of the power switch, wherein the control terminal is driven according to a floating ground level which is not a constant voltage level; and an isolation device, which has a primary side unit and a secondary side unit, wherein the primary side unit is electrically connected to the primary side circuit and the secondary side unit is electrically connected to the secondary side circuit, wherein and the secondary side unit is isolated from the primary side unit, and wherein the isolation device is configured to operably transfer the AC PWM signal from the primary side unit to the secondary side unit and further to the secondary side circuit; wherein the power switch has a current inflow terminal and a current outflow terminal, and is configured to be operably connected to a load circuit in series, and the series circuit of the power switch and the load circuit is configured to receive an AC voltage.

In one preferable embodiment, the AC PWM signal has a first status and a second status, wherein a time period of the first status determines a conductive period of the switch control signal, and a time period of the second status determines a non-conductive period of the switch control signal, wherein a phase-cut angle of the AC voltage is determined by the first status and the second status.

In one preferable embodiment, the master circuit includes: a rectifier circuit, configured to operably receive the AC voltage to generate an rectified voltage; a power regulation circuit, which is coupled to the rectifier circuit, and is configured to operably receive the rectified voltage to generate a DC voltage as a positive power source supplied to the master circuit and the primary side circuit; and a PWM signal generation circuit, which is coupled to the power regulation circuit to receive the DC voltage, and is configured to generate the at least one PWM signal according to the input signal.

In one preferable embodiment, the isolation device includes a transformer or an opto-coupler.

In one preferable embodiment, the PWM signal or the AC PWM signal has a modulated frequency, wherein a conductive period of the switch control signal is determined by a time period wherein the PWM signal or the AC PWM signal operates by a first frequency, and a non-conductive period of the switch control signal is determined by a time period wherein the PWM signal or the AC PWM signal operates by a second frequency; or the PWM signal or the AC PWM signal has a modulated duty ratio, wherein the conductive period of the switch control signal is determined by a time period wherein the PWM signal or the AC PWM signal operates by a first duty ratio, and the non-conductive period of the switch control signal is determined by a time period wherein the PWM signal or the AC PWM signal operates by a second duty ratio.

In one preferable embodiment, the PWM signal or the AC PWM signal has the modulated frequency, and the secondary side circuit includes: a rectifier circuit, which is coupled to the secondary side unit, and is configured to operably convert the AC PWM signal to a rectified PWM signal; a filter circuit, which is coupled to the rectifier circuit, and is configured to operably filter the rectified PWM signal to generate a filtered signal; a comparison circuit, which is coupled to the filter circuit, and is configured to operably generate a comparison signal according to the filtered signal and a reference signal; a logic circuit, which is coupled to the comparison circuit, and is configured to operably generate a setting signal according to the comparison signal and the rectified PWM signal; a latch circuit, which is coupled to the logic circuit, and is configured to operably generate a control signal according to the setting signal and the comparison signal; and a driver circuit, which is coupled to the latch circuit, and is configured to operably generate the switch control signal according to the control signal.

In one preferable embodiment, the PWM signal or the AC PWM signal has the modulated duty ratio, wherein the secondary side circuit includes: a rectifier circuit, which is coupled to the secondary side unit, and is configured to operably convert the AC PWM signal to a rectified PWM signal; a filter circuit, which is coupled to the rectifier circuit, and is configured to operably filter the rectified PWM signal to generate a filtered signal; a comparison circuit, which is coupled to the filter circuit, and is configured to operably generate a comparison signal according to the filtered signal and a reference signal; and a driver circuit, which is coupled to the comparison circuit, and is configured to operably generate the switch control signal according to the comparison signal.

In one preferable embodiment, the load circuit includes a light emitting device circuit, and the switch control signal is configured to dim a brightness of the light emitting device circuit.

From another perspective, the present invention provides a control method of a multi-load control apparatus, comprising: generating at least one pulse width modulation (PWM) signal according to an input signal; generating at least one AC PWM signal according to the at least one PWM signal; transferring the at least one AC PWM signal from one side of an isolation device to another side of the isolation device; and generating at least one switch control signal according to the transferred at least one AC PWM signal, to control at least one corresponding power switch; wherein a control terminal of the power switch is driven according to a floating ground level which is not a constant voltage level; and wherein the power switch has a current inflow terminal and a current outflow terminal, and is configured to be operably connected to a load circuit in series, and the series circuit of the power switch and the load circuit is configured to receive an AC voltage.

In one preferable embodiment, the AC PWM signal has a first status and a second status, wherein a time period of the first status determines a conductive period of the switch control signal, and a time period of the second status determines a non-conductive period of the switch control signal, whereby a phase-cut angle of the AC voltage is determined by the first status and the second status.

In one preferable embodiment, the PWM signal or the AC PWM signal has a modulated frequency, wherein a conductive period of the switch control signal is determined by a time period wherein the PWM signal or the AC PWM signal operates by a first frequency, and a non-conductive period of the switch control signal is determined by a time period wherein the PWM signal or the AC PWM signal operates by a second frequency; or the PWM signal or the AC PWM signal has a modulated duty ratio, wherein the conductive period of the switch control signal is determined by a time period wherein the PWM signal or the AC PWM signal operates by a first duty ratio, and the non-conductive period of the switch control signal is determined by a time period wherein the PWM signal or the AC PWM signal operates by a second duty ratio.

In one preferable embodiment, the PWM signal or the AC PWM signal has the modulated frequency, wherein the step of generating at least one switch control signal according to the transferred at least one AC PWM signal includes: converting the AC PWM signal to a rectified PWM signal; filtering the rectified PWM signal to generate a filtered signal; generating a comparison signal by comparing the filtered signal with a reference signal; performing a logic operation of the comparison signal with the rectified PWM signal to generate a setting signal; generating a control signal according to the setting signal and the comparison signal; and generating the switch control signal according to the control signal.

In one preferable embodiment, the PWM signal or the AC PWM signal has the modulated duty ratio, wherein the step of generating the at least one switch control signal according to the corresponding transferred at least one AC PWM signal includes: converting the AC PWM signal to a rectified PWM signal; filtering the rectified PWM signal to generate a filtered signal; generating a comparison signal by comparing the filtered signal with a reference signal; and generating the switch control signal according to the comparison signal.

In one preferable embodiment, the load circuit includes a light emitting device circuit, and the switch control signal is configured to dim a brightness of the light emitting device circuit.

The objectives, technical details, features, and effects of the present invention will be better understood with regard to the detailed description of the embodiments below.

BRIEF DESCRIPTION OF THE DRAWINGS

FIGS. 8A-8F show signal waveforms when the PWM signal and the AC PWM signal have a modulated frequency, according to the present invention.

DESCRIPTION OF THE PREFERRED EMBODIMENTS

The drawings as referred to throughout the description of the present invention are for illustration only, to show the interrelations between the circuits and the signal waveforms, but not drawn according to actual scale.

Figure 2:
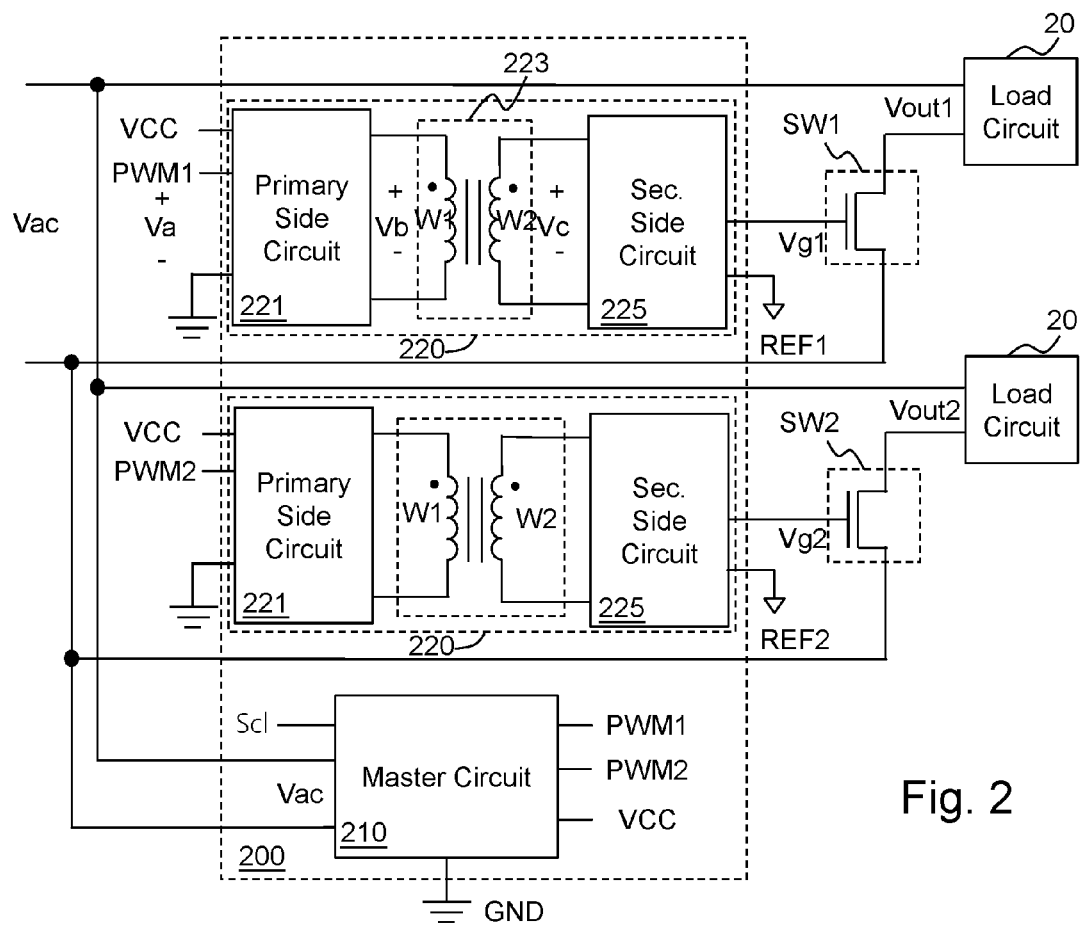
FIG. 2 shows an embodiment of a multi-load control apparatus 200 according to the present invention.

Please refer to FIG. 2 for an embodiment of a multi-load control apparatus 200 according to the present invention. As shown in FIG. 2, the multi-load control apparatus 200 includes a master circuit 210 and at least one slave circuit 220, and each slave circuit 220 controls a corresponding load circuit 20. The load circuit 20 for example includes a dimmable lamp circuit such as a light emitting device circuit, while it can be any circuit that is required to be controlled by the slave circuit 220. In this embodiment, the number of the slave circuits 220 is two, but this is only for illustrative purpose. The number of the slave circuits 220 may be other than two, such as one or more than two. The master circuit 210 receives an AC voltage Vac and generates a DC voltage VCC as a positive power source, which is for example supplied to circuits inside the master circuit 210 and a primary side circuit 221. An example of the signal waveform of the AC voltage Vac is shown in FIG. 8A. The master circuit 210 receives an input signal Scl, and generates at least one pulse width modulation (PWM) signal. In this embodiment, the master circuit 210 generates two PWM signals PWM1 and PWM2; the number of the generated PWM signals corresponds to the number of the slave circuits 220 to be controlled. However, it can be arranged such that plural slave circuits 220 receive one same PWM signal, and in this case the number of the PWM signals can be less than the number of the slave circuits 220. For example, four slave circuits 220 are divided to two groups, wherein each group has two slave circuits 220, and each group receives one same PWM signal. In this example, two PWM signals PWM1 and PWM2 can control four slave circuits. The input signal Scl can be used to transmit a command or a parameter setting, etc., for example but not limited to: turning-ON, turning-OFF, brightness adjustment, other settings, etc. The slave circuit 220 is coupled to the master circuit 210; the slave circuit 220 receives the DC voltage VCC (as a positive power source for its internal circuits), and receives a corresponding one of the PWM signal PWM1 or PWM2, to generate a corresponding switch control signal Vg1 or Vg2 for controlling a corresponding power switch SW1 or SW2. An example of the signal waveform of the voltage Va of the PWM signal PWM1 is shown in FIG. 8C (which is an embodiment wherein the frequency is modulated).

The slave circuit 220 includes the primary circuit 221, an isolation device 223, and a secondary side circuit 225. The isolation device 223 for example can be, but is not limited to, a transformer as shown in the figure, which has a primary winding W1 and a secondary winding W2. The primary side circuit 221 and the master circuit 210 are both electrically connected to a ground level GND. The primary side circuit 221 generates an AC PWM signal according to the corresponding PWM signal (PWM1 or PWM2). For example, as shown in FIG. 2, the PWM signal PWM1 has a voltage Va with reference to the ground level GND, and the AC PWM signal has a voltage Vb between two terminals of the primary winding W1. FIG. 8D shows an example of the signal waveform of the voltage Vb (which is an embodiment wherein the frequency is modulated). Thus, the signal between the two terminals of the primary winding W1 does not rely on a DC level, and the AC PWM signal can be transferred to the secondary winding W2. In the embodiment according to the shown figure, the circuits for converting the PWM signals PWM1 and PWM2 to the corresponding AC PWM signals are located in the primary circuits 221 respectively. In another embodiment, the circuits for converting the PWM signals PWM1 and PWM2 to the corresponding AC PWM signals may be integrated in the master circuit 210; in other words, part of the primary circuits 221 may be integrated in the master circuit 210, which is an equivalent with respect to achieving the desired functions.

The isolation device 223 is for example but not limited to a transformer as shown in the figure, for transferring the AC PWM signal from a primary side unit, i.e., the primary winding W1, to a secondary side unit, i.e., the secondary winding W2, with a voltage Vc between the two terminals of the secondary winding W2, while the secondary side unit is isolated from the primary side unit; the voltage Vc is sent to the secondary side circuit 225. The voltage Vc for example can have a signal waveform which is substantially same as the voltage Vb (or with a level shift if required). The secondary side circuit 225 is coupled to a control terminal (for example but not limited to a gate of a MOS device as shown in the figure) of a power switch SW1. The secondary side circuit 225 is configured to generate a switch control signal Vg1 according to the AC PWM signal (the voltage Vc). FIG. 8E shows an example of the signal waveform of the switch control signal Vg1.

Note that, the switch control signal Vg1 does not directly follow the frequency or the duty ratio of the AC PWM signal (Vb or Vc); the conductive period of the switch control signal Vg1 is determined by a time period wherein the AC PWM signal (Vb or Vc) operates with a specific frequency or with a specific duty ratio, and the non-conductive period of the switch control signal Vg1 is determined by a time period wherein the AC PWM signal (Vb or Vc) operates with another specific frequency or with another specific duty ratio. Thus, from one perspective, generating the PWM signal PWM1 or PWM2 and the AC PWM signal (Vb or Vc) according to the input signal Scl, may be considered as an analog encoding step; and generating the switch control signal Vg1 according to the AC PWM signal (Vb or Vc), may be considered as an analog decoding step. The AC PWM signal (Vb or Vc) has a first status and a second status, and the arrangement of the first status and the second status is an analog encoding. The time period of the first status determines the conductive period of the switch control signal Vg1, and the time period of the second status determines the non-conductive period of the switch control signal Vg1, whereby a phase-cut angle of the AC voltage Vac received by the load circuit 20 is determined. The "status" can be, for example but not limited to, a frequency, a duty ratio, or other feature of the AC PWM signal (a level, an average value, etc.). As an illustrative example, in the embodiment shown in FIGS. 8C-8E, the conductive period of the switch control signal Vg1 is determined according to the time period wherein the AC PWM signal (Vb or Vc) operates with a first frequency, and the non-conductive period of the switch control signal Vg1 is determined according to the time period wherein the AC PWM signal (Vb or Vc) operates with a second frequency. In another embodiment, which will be described in detail later, the conductive period of the switch control signal Vg1 is determined according to the time period wherein the AC PWM signal (Vb or Vc) operates with a first duty ratio, and the non-conductive period of the switch control signal Vg1 is determined according to the time period wherein the AC PWM signal (Vb or Vc) operates with a second duty ratio.

The control terminal receives the switch control signal Vg1, and the power switch SW1 operates accordingly. The control terminal of the power switch SW1 is driven according to a floating ground level. More specifically, the ground level of the power switch SW1 is from one terminal of the AC voltage Vac, which is not a constant voltage level, and the power switch SW1 operates relatively to this ground level, so the positive and negative operation voltages of the power switch SW1 are both floating. The ground level of the secondary side circuit 225 for example can be coupled to a reference level REF1, wherein the absolute voltage difference between the reference level REF1 and the ground level GND is uncertain. A current inflow terminal and a current outflow terminal of the power switch SW1 (a drain and a source of the MOS device as shown in the figure) are connected to the corresponding load circuit 20 in series, and the series circuit of the power switch SW1 and the load circuit 20 receives the AC voltage Vac. As such, the plural PWM signals generated by the master circuit 210 which is coupled to the ground level GND, can control plural power switches with floating driving levels through the slave circuits 220. In one embodiment, the load circuit 20 includes a light emitting device circuit, and the switch control signal Vg1 can perform dimming control, i.e., can adjust the brightness of the light emitting device circuit. In this case, the switch control signal Vg1 operates the power switch SW1 such that the voltage across the load circuit 20, i.e., the output voltage Vout1, is a phase-cut part of the AC voltage Vac, as shown in FIG. 8F; the phase-cut angle of the AC voltage Vac is determined by the switch control signal Vg1 i.e., determined by a ratio of the first status and the second status of the PWM signal (Vb or Vc). Likewise, the switch control signal Vg2 and the output voltage Vout2 can be generated according to the PWM signal PWM2 by the same way as how the switch control signal Vg1 and the output voltage Vout1 are generated according to the PWM signal PWM1; however, for individual control, the signal waveforms and amplitudes of the switch control signal Vg2, the output voltage Vout2 and the PWM signal PWM2 may be different from the switch control signal Vg1, the output voltage Vout1 and the PWM signal PWM1. Besides, it is not necessary for the reference level REF2 to be the same as the reference level REF1.

Figure 1:
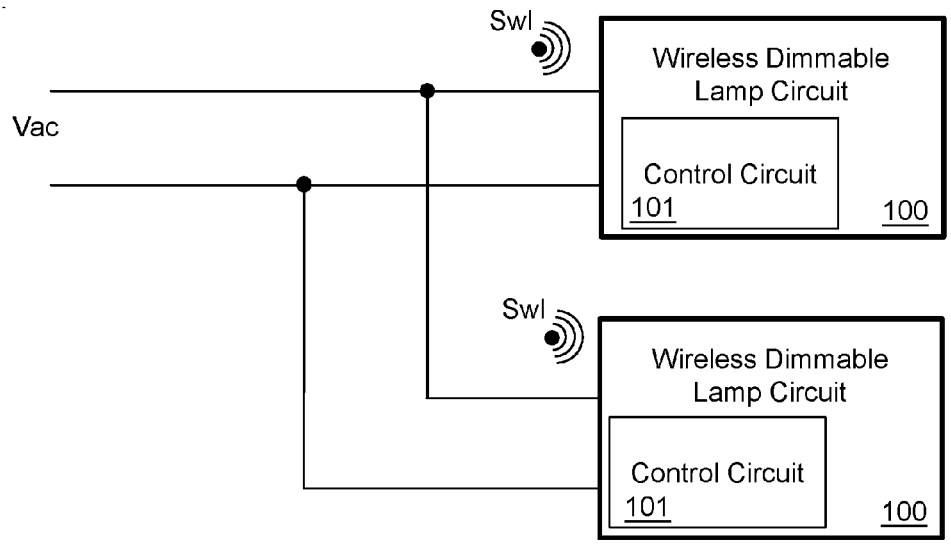
FIG. 1 shows a conventional wireless dimmable lamp circuit 100.

In the embodiment that the load circuit 20 includes a light emitting device circuit and the switch control signal Vg1 can perform dimming control, the multi-load control apparatus 200 can adjust the brightness of plural light emitting device circuits individually according to the input signal Swl (FIG. 1), which is transmitted by wire or wirelessly to be the input signal Scl received by the master circuit 210. In other embodiments, the load circuit 20 may be other circuits different from the light emitting device circuit. Note that, as shown by FIG. 8F, the signal waveform of the output voltage Vout1 is similar to a signal waveform generated by a triode for alternating current (TRIAC); therefore, the present invention can be applied to any circuitry which can operate in cooperation with a TRIAC dimming switch, to individually control multiple load circuits.

The frequencies shown in FIGS. 8A-8F are for illustration only, but not drawn according to actual scale. In one practical example, the local high frequency of the PWM signal PWM1 is about 300 KHz-1 MHz, while the frequency of the switch control signal is about 50 Hz-1 KHz, the local high frequency of the PWM signal PWM1 being higher than the frequency of the switch control signal over ten times.

Figure 3:
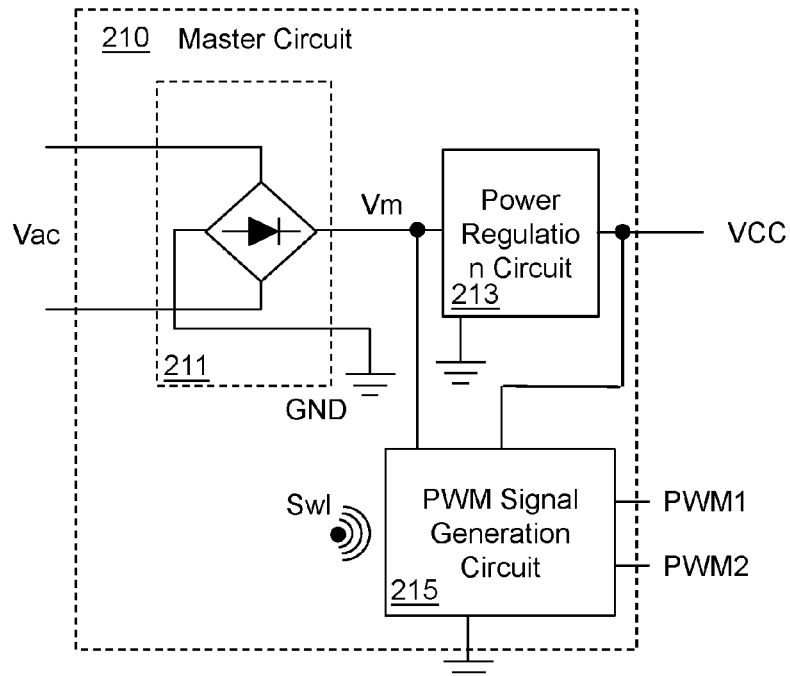
FIG. 3 shows an embodiment of a master circuit 210 according to the present invention.

FIG. 3 shows an embodiment of a master circuit 210 according to the present invention. As shown in the figure, the master circuit 210 includes: a rectifier circuit 211, a power regulation circuit 213, and a PWM signal generation circuit 215. The rectifier circuit 211 receives the AC voltage Vac and generates an rectified voltage Vm; an example of the signal waveform of the rectified voltage Vm is shown in FIG. 8B. The power regulation circuit 213 is coupled to the rectifier circuit 211, for receiving the rectified voltage Vm and generating a DC voltage VCC for supplying electrical power to the master circuit 210 and the primary side circuit 221. In this embodiment, the input signal is for example but not limited to a wireless input signal Swl. The wireless input signal Swl is delivered by a wireless communication method, for example but not limited to: a wireless network WI-FI signal, a Bluetooth signal, an infrared signal, a radio-frequency (RF) signal, etc. The PWM signal generation circuit 215 is coupled to the power regulation circuit 213 to receive the DC voltage VCC, and the PWM signal generation circuit 215 generates the PWM signals PWM1 and PWM2 according to the wireless input signal Swl. The PWM signal generation circuit 215 for example can generate the PWM signals PWM1 and PWM2 further according to the rectified voltage Vm (i.e., generating the PWM signals PWM1 and PWM2 according to the input signal Swl and the rectified voltage Vm), such that the PWM signals PWM1 and PWM2 are synchronized with the rectified voltage Vm.

Figure 4:
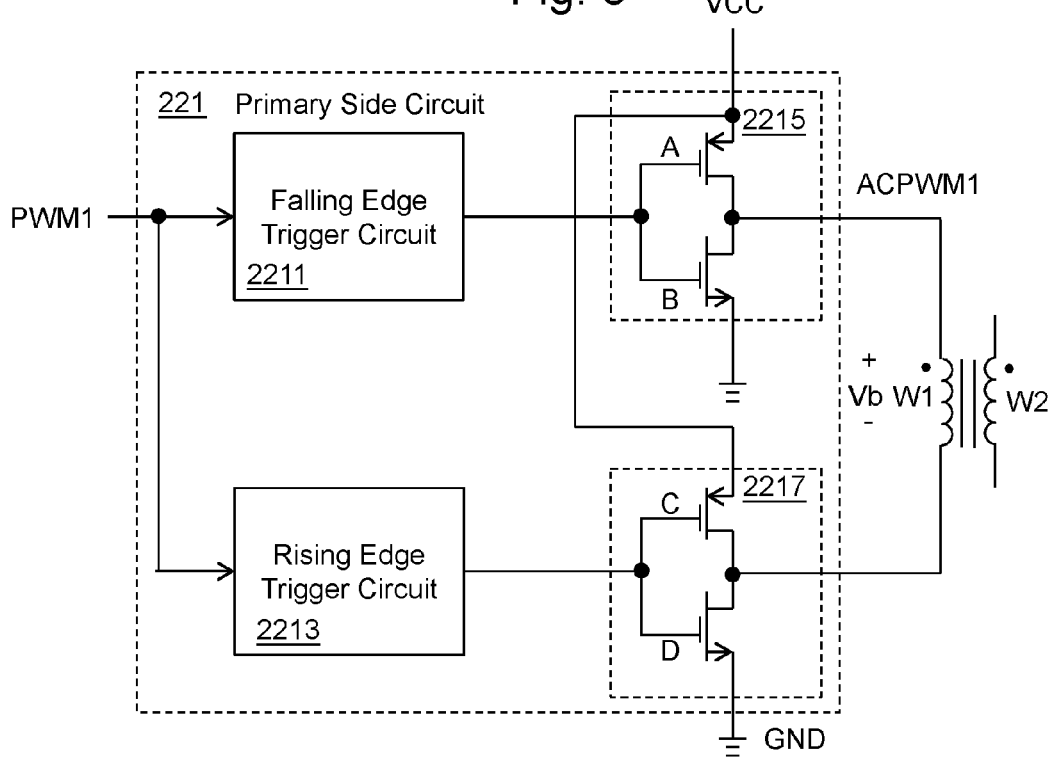
FIG. 4 shows a more specific embodiment of a primary side circuit 221 according to the present invention.
Figure 5:
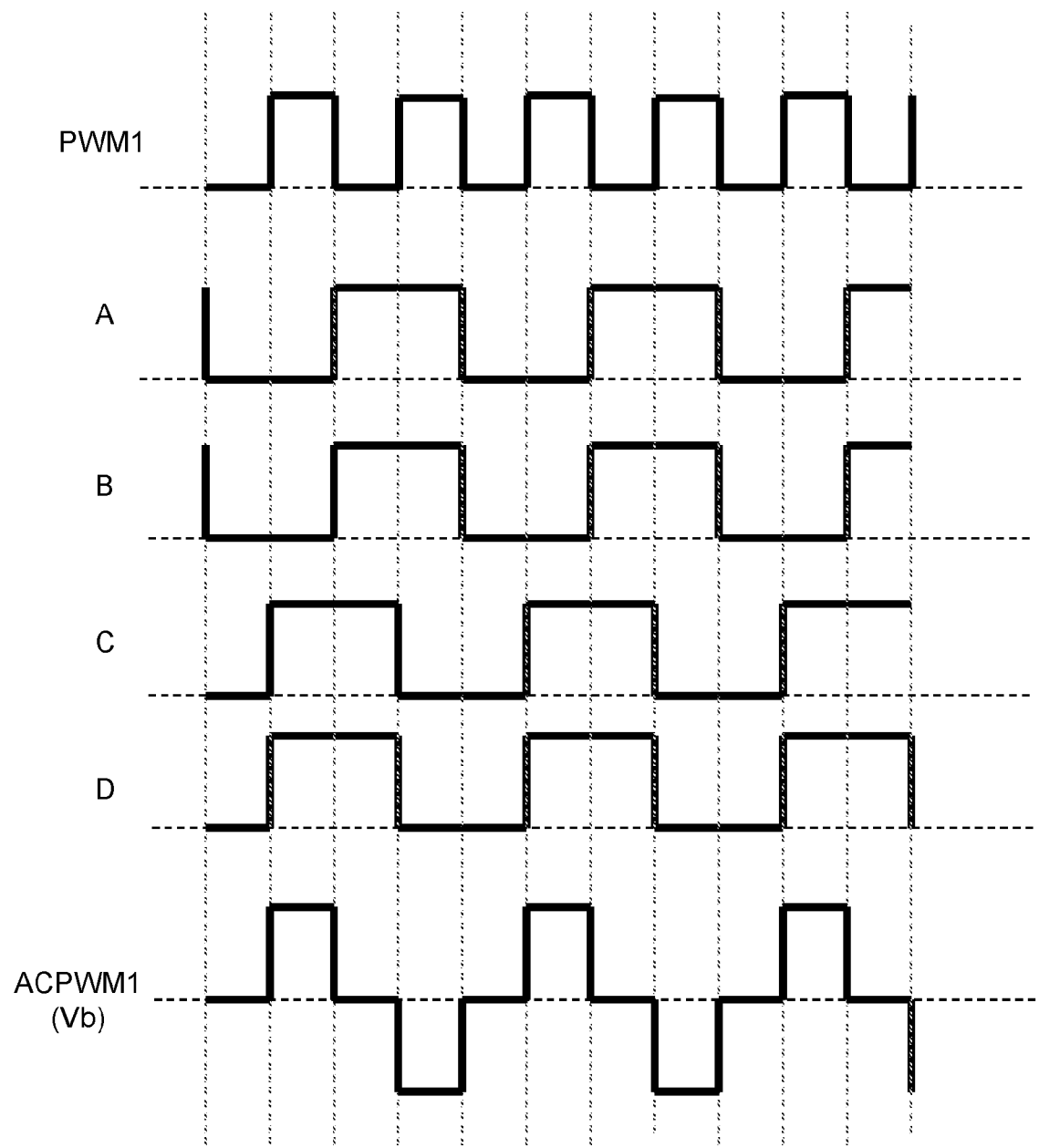
FIG. 5 shows signal waveforms when converting a PWM signal PWM1 to an AC PWM signal ACPWM1, according to the present invention.

FIG. 4 shows a more specific embodiment of a primary side circuit 221 according to the present invention. As shown in the figure, the primary side circuit 221 includes a falling edge trigger circuit 2211, a rising edge trigger circuit 2213, and two inverters 2215 and 2217. This embodiment illustrates an example as to how to convert the PWM signal PWM1, which is a DC signal, to the AC PWM signal ACPWM1, which is an AC signal. FIG. 5 shows a schematic diagram of related signal waveforms as the PWM signal PWM1 is converted to the AC PWM signal ACPWM1 according to the present invention. The falling edge trigger circuit 2211 receives the PWM signal PWM1, and generates a signal A and a signal B by falling-edge-trigger, as shown by the signal waveforms of the signal A and the signal B in FIG. 5. On the other hand, the rising edge trigger circuit 2213 receives the PWM signal PWM1, and generates a signal C and a signal C by rising-edge-trigger, as shown by the signal waveforms of the signal C and the signal D in FIG. 5. The inverter 2215 receives the signal A and the signal B, and the inverter 2217 receives the signal C and the signal D, whereby the AC PWM signal ACPWM1 is generated between two terminals of the primary winding W1; the AC PWM signal ACPWM1 has a voltage Vb, as shown in FIG. 5. According to the present invention, the method of converting the DC PWM signal PWM1 to the AC PWM signal ACPWM1 is not limited to the method shown in FIG. 4. There are other methods to convert the DC PWM signal PWM1 to the AC PWM signal ACPWM1. For example, if the duty ratio of the DC PWM signal PWM1 is 50%, the DC PWM signal PWM1 can be converted to the AC PWM signal ACPWM1 by shifting lower the DC PWM signal PWM1 by half of its magnitude.

Figure 6:
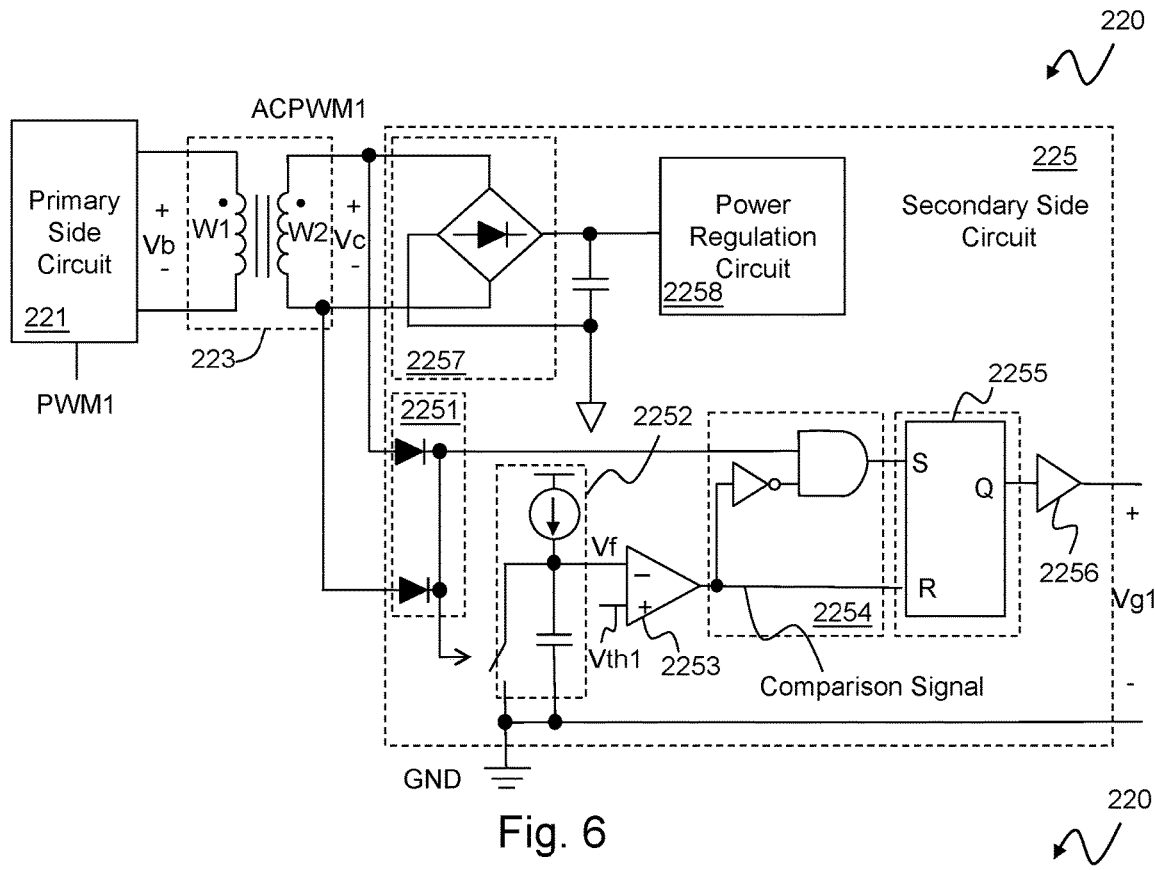
FIG. 6 shows a more specific embodiment of a secondary side circuit 225 according to the present invention.

FIG. 6 shows a more specific embodiment of a secondary side circuit 225 according to the present invention. In this embodiment, the PWM signal PWM1 (and/or the AC PWM signal ACPWM1) has a modulated frequency, i.e., the first status and the second status are encoded by different frequencies.

As shown in this figure, the secondary side circuit 225 includes: a rectifier circuit 2251, a filter circuit 2252, a comparison circuit 2253, a logic circuit 2254, a latch circuit 2255, a driver circuit 2256, a rectifier circuit 2257, and a power regulation circuit 2258. The rectifier circuit 2251 is coupled to the secondary side unit. In this embodiment, the secondary side unit is for example the secondary winding W2. The rectifier circuit 2251 is for converting the AC PWM signal ACPWM1 to a rectified PWM signal. The rectifier circuit 2251 includes for example but not limited to two diodes as shown in the figure. The filter circuit 2252 is coupled to the rectifier circuit 2251, and is configured to filter the rectified PWM signal to generate a filtered signal Vf. FIG. 9C shows an example of the signal waveform of the filtered signal Vf. The filter circuit 2252 includes for example but not limited to a current source circuit, a switch, and a capacitor. The capacitor is charged and discharged as the rectified PWM signal turns ON and OFF the switch, to generate the filtered signal Vf as shown in FIG. 9C. The comparison circuit 2253 is coupled to the filter circuit 2252, and is configured to generate a comparison signal according to the filtered signal Vf and a reference signal Vth1. The logic circuit 2254 is coupled to the comparison circuit 2253, and is configured to generate a setting signal S according to the comparison signal and the rectified PWM signal. The latch circuit 2255 is coupled to the logic circuit 2254, and is configured to generate a control signal Q according to the setting signal S and the comparison signal. The driver circuit 2256 is coupled to the latch circuit 2255, and is configured to generate the switch control signal Vg according to the control signal Q. The logic circuit 2254 includes for example but not limited to a logic NOT gate and a logic AND gate as shown in the figure. The comparison signal is used as a resetting signal of the latch circuit 2255. The latch circuit 2255 includes for example but not limited to an RS flip-flop, which generates the control signal Q at its output terminal. The rectifier circuit 2257 and the power regulation circuit 2258 receive the voltage Vc, to generate an internal DC voltage which is supplied to the secondary side circuit 225 as a positive power source.

Figure 9A:
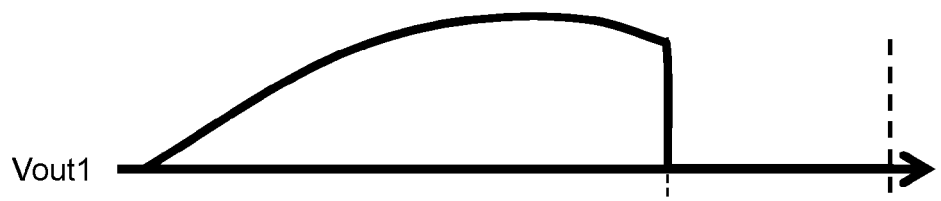
FIGS. 9A-9D show signal waveforms when the PWM signal and the AC PWM signal have a modulated frequency, according to the present invention.
Figure 9B:
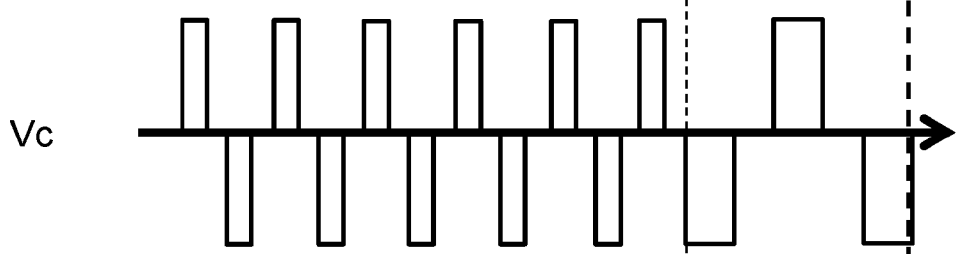
Figure 9C:
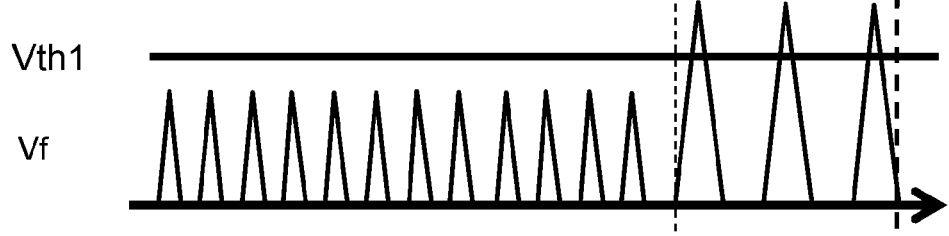
Figure 9D:

FIGS. 9A-9D show schematic diagrams of related signal waveforms when the PWM signal and the AC PWM signal have a modulated frequency, according to the present invention. FIG. 9A shows an example of the signal waveform of a voltage drop between the load circuit 20, i.e., the output voltage Vout1, which is a phase-cut part of the AC voltage Vac. FIG. 9C shows an example of the signal waveforms of the filtered signal Vf and the reference signal Vth1. As shown in the figure, the filtered signal Vf is compared with the reference signal Vth1; when the filtered signal Vf is lower than the reference signal Vth1, the switch control signal Vg1 is set to high level, and when the filtered signal Vf is not lower than the reference signal Vth1, the switch control signal Vg1 is set to low level. FIG. 9D shows the corresponding signal waveform of the switch control signal Vg1. The logic circuit 2254 generates the setting signal S of the latch circuit 2255 according to the rectified PWM signal and the comparison signal. The comparison signal is used as a reset signal R of the latch circuit 2255. Thus, the time period of the first status of the AC PWM signal ACPWM1 determines the conductive period of the switch control signal Vg1, and the time period of the second status of the AC PWM signal ACPWM1 determines the non-conductive period of the switch control signal Vg1.

Figure 10:
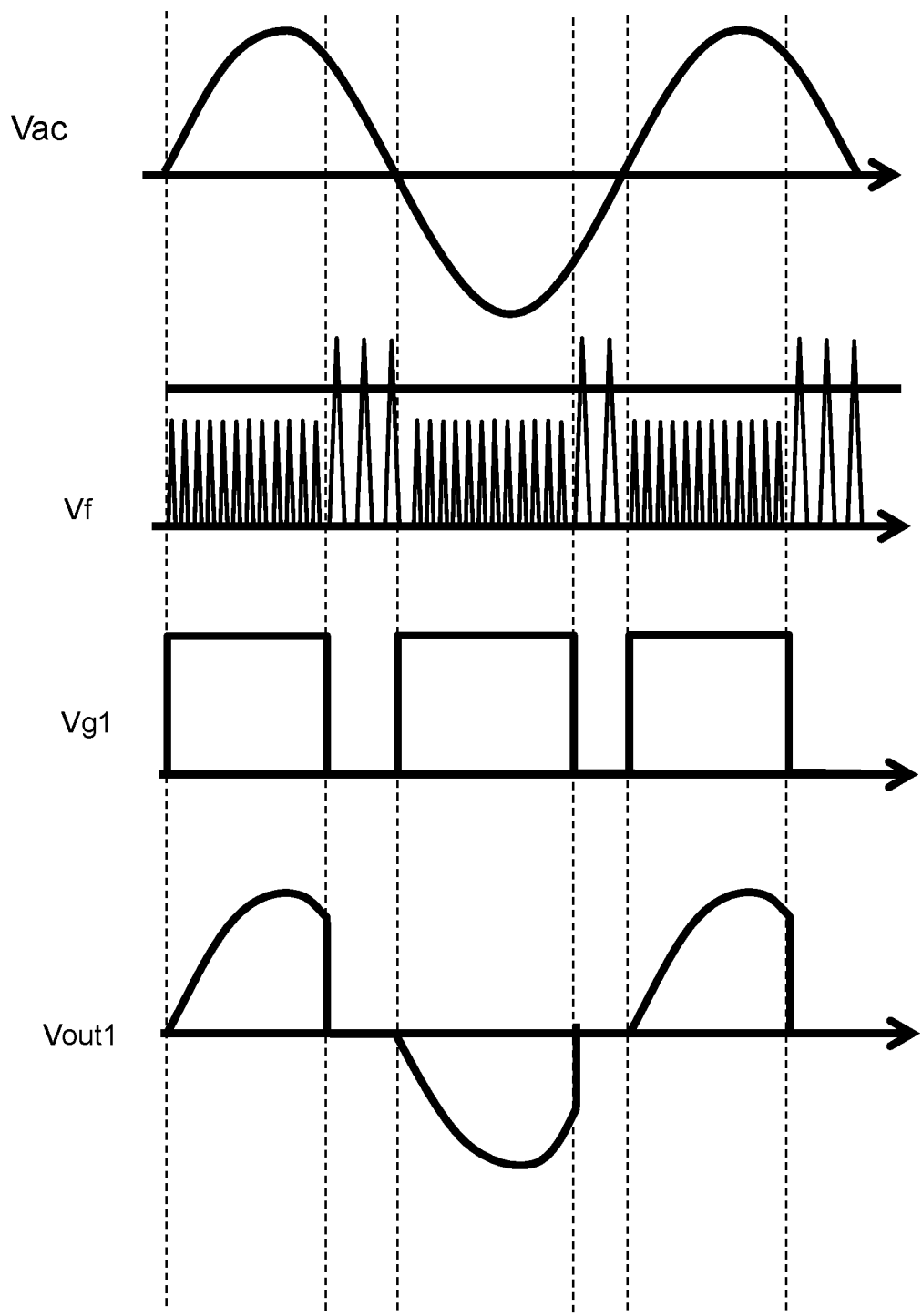
FIG. 10 shows show signal waveforms when the PWM signal and the AC PWM signal have a modulated frequency, according to the present invention.

FIG. 10 shows a schematic diagram of related signal waveforms when the PWM signal and the AC PWM signal have a modulated frequency, according to the present invention. FIG. 10 indicates that the phase-cut angle of the output voltage Vout can be adjusted.

Figure 7:
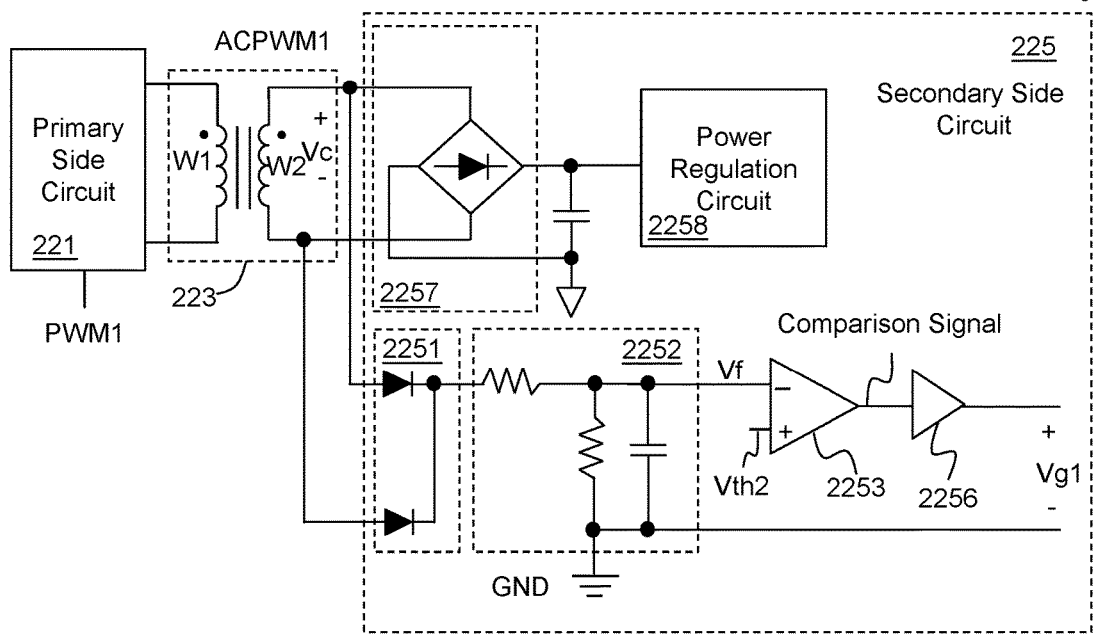
FIG. 7 shows another more specific embodiment of the secondary side circuit 225 according to the present invention.

FIG. 7 shows another more specific embodiment of the secondary side circuit 225 according to the present invention. In this embodiment, the PWM signal PWM1 (and/or the AC PWM signal ACPWM1) has a modulated duty ratio, i.e., the first status and the second status are encoded by different duty ratios.

As shown in FIG. 7, in this embodiment, the secondary side circuit 225 includes: a rectifier circuit 2251, a filter circuit 2252, a comparison circuit 2253, a driver circuit 2256, a rectifier circuit 2257, and a power regulation circuit 2258. The rectifier circuit 2251 is coupled to the secondary side unit. In this embodiment, the secondary side unit is for example the secondary winding W2. The rectifier circuit 2251 is configured to convert the AC PWM signal ACPWM1 to the rectified PWM signal. The rectifier circuit 2251 includes for example but not limited to two diodes as shown in the figure. The filter circuit 2252 is coupled to the rectifier circuit 2251, for filtering the rectified PWM signal to generate a filtered signal Vf. FIG. 11B shows an example of the signal waveform of the filtered signal Vf. The filter circuit 2252 includes for example but not limited to an RC circuit as shown in the figure. A capacitor of the RC circuit is charged and discharged, to generate the filtered signal Vf as shown in FIG. 11B. The comparison circuit 2253 is coupled to the filter circuit 2252, and is configured to generate a comparison signal according to the filtered signal Vf and a reference signal Vth2. Besides, the rectifier circuit 2257 and the power regulation circuit 2258 receive the voltage Vc, to generate an internal DC voltage which is supplied to the secondary side circuit 225 as a positive power source.

Figure 11A:
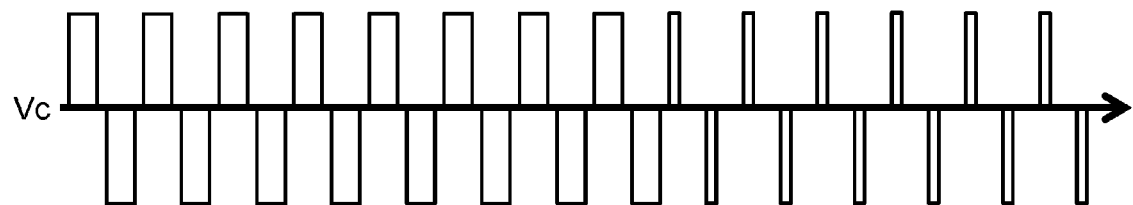
FIGS. 11A-11C show signal waveforms when the PWM signal and the AC PWM signal have a modulated duty ratio, according to the present invention.
Figure 11B:
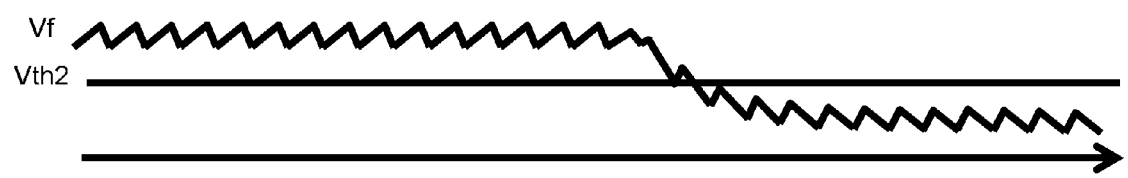
Figure 11C:

FIGS. 11A-11C show related signal waveforms when the PWM signal and the AC PWM signal have a modulated duty ratio, according to the present invention. FIG. 11A shows an example of the signal waveform of the voltage Vc of the PWM signal ACPWM1. FIG. 11B shows an example of the signal waveform of the filtered signal Vf and the reference signal Vth2. As shown in the figure, the filtered signal Vf is compared with the reference signal Vth2; when the filtered signal Vf is higher than the reference signal Vth2, the switch control signal Vg1 is set to high level as shown in FIG. 11C, and when the filtered signal Vf is not higher than the reference signal Vth2, the switch control signal Vg1 is set to low level as shown in FIG. 11C. FIG. 11C shows a corresponding signal waveform of the switch control signal Vg1.

Figure 12:
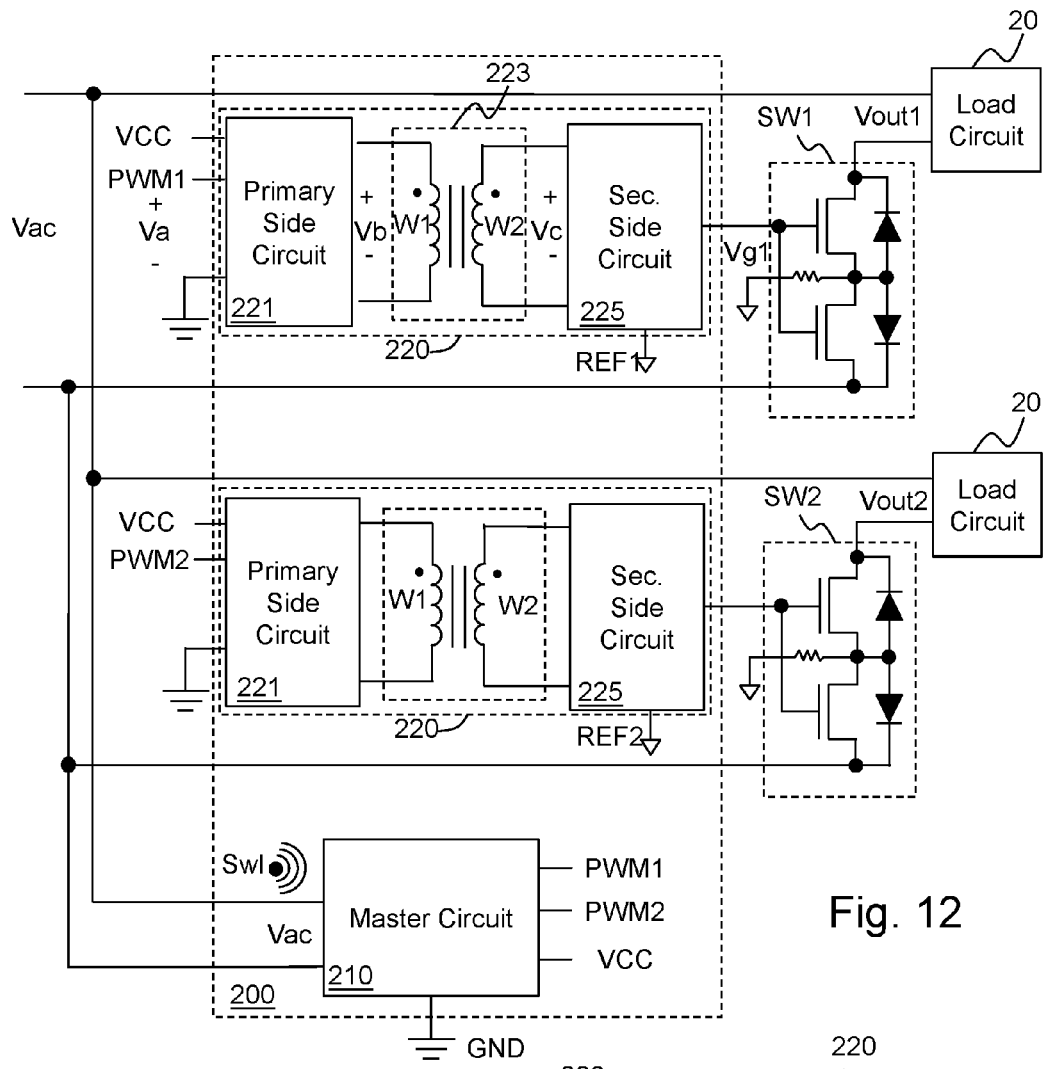
FIG. 12 shows another embodiment of the multi-load control apparatus 200 according to the present invention.
Figure 13:
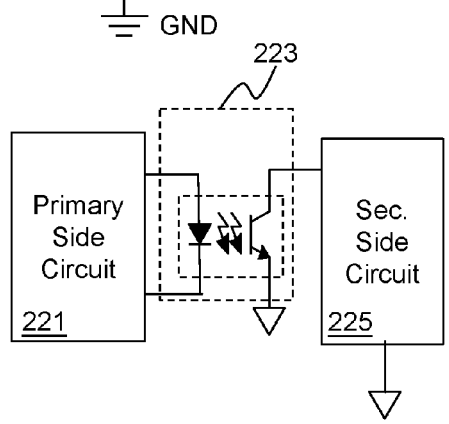
FIG. 13 shows a more specific embodiment of an isolation device 223 according to the present invention.

FIG. 12 shows another embodiment of the multi-load control apparatus 200 according to the present invention. This embodiment indicates that, the power switch SW may include two switch devices as shown in FIG. 12, not limited to only one switch device. FIG. 13 shows another embodiment of the isolation device 223 according to the present invention. This embodiment indicates that the isolation device 223 may be an opto-coupler device, not limited to a transformer.

The present invention has been described in considerable detail with reference to certain preferred embodiments thereof. It should be understood that the description is for illustrative purpose, not for limiting the scope of the present invention. Those skilled in this art can readily conceive variations and modifications within the spirit of the present invention. For example, a device or circuit which does not substantially influence the primary function of a signal can be inserted between any two devices or circuits in the shown embodiments, so the term "couple" should include direct and indirect connections. For another example, the resistors or the voltage divider circuit is not limited to a circuit formed by passive devices, but it may be formed by other circuits, such as transistors. For another example, inverted and non-inverted input terminals of the error amplifier circuit and the comparator circuit are interchangeable, with corresponding amendments of the circuits processing these signals. For another example, when an external signal of the master circuit (for example but not limited to the input signal) is obtained and processed inside by the master circuit, the signal may be subject to a voltage-to-current conversion, a current-to-voltage conversion, or/and a ratio conversion, etc., and therefore, "processing or operating according to a signal" in the present invention, is not limited to processing or operating exactly according to the signal itself, but can be according to a converted form of the signal. For another example, it is not limited for each of the embodiments described hereinbefore to be used alone; under the spirit of the present invention, two or more of the embodiments described hereinbefore can be used in combination. For example, two or more of the embodiments can be used together, or, apart of one embodiment can be used to replace a corresponding part of another embodiment. For example, the primary side circuit 221 shown in FIG. 4 can be applied to the embodiments shown in FIGS. 2, 6, 7, and 12, etc. In view of the foregoing, the spirit of the present invention should cover all such and other modifications and variations, which should be interpreted to fall within the scope of the following claims and their equivalents.

What is claimed is:

1. A multi-load control apparatus, comprising:
a master circuit, configured to operably generate at least one pulse width modulation (PWM) signal according to an input signal; and
at least one slave circuit, which is coupled to the master circuit, and is configured to operably generate at least one switch control signal according to a corresponding one of the at least one PWM signal, to control at least one corresponding power switch;
wherein the slave circuit includes a primary side circuit and a secondary side circuit, wherein the primary side circuit and the master circuit are commonly coupled to a ground level, and the primary side circuit is configured to generate an AC PWM signal according to the corresponding PWM signal, and wherein the secondary side circuit is coupled to a control terminal of the power switch, and the secondary side circuit is configured to operably generate the switch control signal according to the corresponding AC PWM signal;
wherein the power switch operates according to the switch control signal received by the control terminal;
wherein the control terminal is driven according to a floating ground level which is not a constant voltage level; and wherein the power switch has a current inflow terminal and a current outflow terminal, and is configured to be operably connected to a load circuit in series, and the series circuit of the power switch and the load circuit is configured to receive an AC voltage;
wherein the slave circuit includes:
the primary side circuit, configured to operably generate the AC PWM signal according to the PWM signal;
an isolation device, which has a primary side unit electrically connected to the primary side circuit and a secondary side unit electrically connected to the secondary side circuit, wherein and the secondary side unit is isolated from the primary side unit, and wherein the isolation device is configured to operably transfer the AC PWM signal from the primary side unit to the secondary side unit and further to the secondary side circuit; and
the secondary side circuit, configured to operably generate the switch control signal according to the AC PWM signal;
wherein the PWM signal or the AC PWM signal has a modulated frequency, wherein a conductive period of the switch control signal is determined by a time period wherein the PWM signal or the AC PWM signal operates by a first frequency, and a non-conductive period of the switch control signal is determined by a time period wherein the PWM signal or the AC PWM signal operates by a second frequency; or
the PWM signal or the AC PWM signal has a modulated duty ratio, wherein the conductive period of the switch control signal is determined by a time period wherein the PWM signal or the AC PWM signal operates by a first duty ratio, and the non-conductive period of the switch control signal is determined by a time period wherein the PWM signal or the AC PWM signal operates by a second duty ratio;
wherein the PWM signal or the AC PWM signal has the modulated frequency, and the secondary side circuit includes:

a rectifier circuit, which is coupled to the secondary side unit, and is configured to operably convert the AC PWM signal to a rectified PWM signal;
a filter circuit, which is coupled to the rectifier circuit, and is configured to operably filter the rectified PWM signal to generate a filtered signal;
a comparison circuit, which is coupled to the filter circuit, and is configured to operably generate a comparison signal according to the filtered signal and a reference signal;
a logic circuit, which is coupled to the comparison circuit, and is configured to operably generate a setting signal according to the comparison signal and the rectified PWM signal;
a latch circuit, which is coupled to the logic circuit, and is configured to operably generate a control signal according to the setting signal and the comparison signal; and
a driver circuit, which is coupled to the latch circuit, and is configured to operably generate the switch control signal according to the control signal.

2. The multi-load control apparatus of claim 1, wherein the AC PWM signal has a first status and a second status, wherein a time period of the first status determines a conductive period of the switch control signal, and a time period of the second status determines a non-conductive period of the switch control signal, whereby a phase-cut angle of the AC voltage is determined by the first status and the second status.

3. The multi-load control apparatus of claim 1, wherein the master circuit includes:
a rectifier circuit, configured to operably receive the AC voltage to generate an rectified voltage;
a power regulation circuit, which is coupled to the rectifier circuit, and is configured to operably receive the rectified voltage to generate a DC voltage as a positive power source supplied to the master circuit and the primary side circuit; and
a PWM signal generation circuit, which is coupled to the power regulation circuit to receive the DC voltage, and is configured to generate the at least one PWM signal according to the input signal.

4. The multi-load control apparatus of claim 1, wherein the isolation device includes a transformer or an opto-coupler.

5. The multi-load control apparatus of claim 1, wherein the load circuit includes a light emitting device circuit, and the switch control signal is configured to dim a brightness of the light emitting device circuit.

6. The multi-load control apparatus of claim 1, wherein the input signal includes a wireless input signal.

7. A slave circuit of a multi-load control apparatus, wherein the multi-load control apparatus includes a master circuit and at least one the slave circuit, wherein the master circuit is configured to operably generate at least one pulse width modulation (PWM) signal according to an input signal, and wherein the at least one slave circuit is coupled to the master circuit, and is configured to operably generate at least one switch control signal according to a corresponding one of the at least one PWM signal, to control at least one corresponding power switch, the slave circuit comprising:
a primary side circuit, which is configured to operably generate an AC PWM signal according to the corresponding PWM signal, wherein the primary side circuit and the master circuit are commonly coupled to a ground level;

a secondary side circuit, which is coupled to a control terminal of the power switch, and is configured to operably generate the switch control signal according to the AC PWM signal, such that the power switch operates according to the switch control signal received by the control terminal of the power switch, wherein the control terminal is driven according to a floating ground level which is not a constant voltage level; and an isolation device, which has a primary side unit and a secondary side unit, wherein the primary side unit is electrically connected to the primary side circuit and the secondary side unit is electrically connected to the secondary side circuit, wherein and the secondary side unit is isolated from the primary side unit, and wherein the isolation device is configured to operably transfer the AC PWM signal from the primary side unit to the secondary side unit and further to the secondary side circuit;

wherein the power switch has a current inflow terminal and a current outflow terminal, and is configured to be operably connected to a load circuit in series, and the series circuit of the power switch and the load circuit is configured to receive an AC voltage;

wherein the PWM signal or the AC PWM signal has a modulated frequency, wherein a conductive period of the switch control signal is determined by a time period wherein the PWM signal or the AC PWM signal operates by a first frequency, and a non-conductive period of the switch control signal is determined by a time period wherein the PWM signal or the AC PWM signal operates by a second frequency; or the PWM signal or the AC PWM signal has a modulated duty ratio, wherein the conductive period of the switch control signal is determined by a time period wherein the PWM signal or the AC PWM signal operates by a first duty ratio, and the non-conductive period of the switch control signal is determined by a time period wherein the PWM signal or the AC PWM signal operates by a second duty ratio;

wherein the PWM signal or the AC PWM signal has the modulated frequency, and the secondary side circuit includes:

a rectifier circuit, which is coupled to the secondary side unit, and is configured to operably convert the AC PWM signal to a rectified PWM signal;

a filter circuit, which is coupled to the rectifier circuit, and is configured to operably filter the rectified PWM signal to generate a filtered signal;

a comparison circuit, which is coupled to the filter circuit, and is configured to operably generate a comparison signal according to the filtered signal and a reference signal;

a logic circuit, which is coupled to the comparison circuit, and is configured to operably generate a setting signal according to the comparison signal and the rectified PWM signal;

a latch circuit, which is coupled to the logic circuit, and is configured to operably generate a control signal according to the setting signal and the comparison signal; and a driver circuit, which is coupled to the latch circuit, and is configured to operably generate the switch control signal according to the control signal.

8. The slave circuit of claim 7, wherein the AC PWM signal has a first status and a second status, wherein a time period of the first status determines a conductive period of the switch control signal, and a time period of the second status determines a non-conductive period of the switch control signal, whereby a phase-cut angle of the AC voltage is determined by the first status and the second status.

9. The slave circuit of claim 7, wherein the master circuit includes:

a rectifier circuit, configured to operably receive the AC voltage to generate an rectified voltage;

a power regulation circuit, which is coupled to the rectifier circuit, configured to operably receive the rectified voltage to generate a DC voltage as a positive power source supplied to the master circuit and the primary side circuit; and a PWM signal generation circuit, which is coupled to the power regulation circuit to receive the DC voltage, and is configured to generate the at least one PWM signal according to the input signal.

10. The slave circuit of claim 7, wherein the isolation device includes a transformer or an opto-coupler.

11. The slave circuit of claim 7, wherein the load circuit includes a light emitting device circuit, and the switch control signal is configured to dim a brightness of the light emitting device circuit.

12. The slave circuit of claim 7, wherein the input signal includes a wireless input signal.

13. A control method of a multi-load control apparatus, comprising:

generating at least one pulse width modulation (PWM) signal according to an input signal;

generating at least one AC PWM signal according to the at least one PWM signal;

transferring the at least one AC PWM signal from one side of an isolation device to another side of the isolation device; and generating at least one switch control signal according to the transferred at least one AC PWM signal, to control at least one corresponding power switch;

wherein a control terminal of the power switch is driven according to a floating ground level which is not a constant voltage level; and wherein the power switch has a current inflow terminal and a current outflow terminal, and is configured to be operably connected to a load circuit in series, and the series circuit of the power switch and the load circuit is configured to receive an AC voltage;

wherein the PWM signal or the AC PWM signal has a modulated frequency, wherein a conductive period of the switch control signal is determined by a time period wherein the PWM signal or the AC PWM signal operates by a first frequency, and a non-conductive period of the switch control signal is determined by a time period wherein the PWM signal or the AC PWM signal operates by a second frequency; or the PWM signal or the AC PWM signal has a modulated duty ratio, wherein the conductive period of the switch control signal is determined by a time period wherein the PWM signal or the AC PWM signal operates by a first duty ratio, and the non-conductive period of the switch control signal is determined by a time period wherein the PWM signal or the AC PWM signal operates by a second duty ratio;

wherein the PWM signal or the AC PWM signal has the modulated frequency, wherein the step of generating at least one switch control signal according to the transferred at least one AC PWM signal includes:

converting the AC PWM signal to a rectified PWM signal;
filtering the rectified PWM signal to generate a filtered signal;

generating a comparison signal by comparing the filtered signal with a reference signal;

performing a logic operation of the comparison signal with the rectified PWM signal to generate a setting signal;

generating a control signal according to the setting signal and the comparison signal; and generating the switch control signal according to the control signal.

14. The control method of claim 13, wherein the AC PWM signal has a first status and a second status, wherein a time period of the first status determines a conductive period of the switch control signal, and a time period of the second status determines a non-conductive period of the switch control signal, whereby a phase-cut angle of the AC voltage is determined by the first status and the second status.

15. The control method of claim 13, wherein the load circuit includes a light emitting device circuit, and the switch control signal is configured to dim a brightness of the light emitting device circuit.

16. The control method of claim 13, wherein the input signal includes a wireless input signal.

* * * * *